June 30, 1936.  C. W. DU BOIS  2,045,703
FISH LURE
Filed June 25, 1935
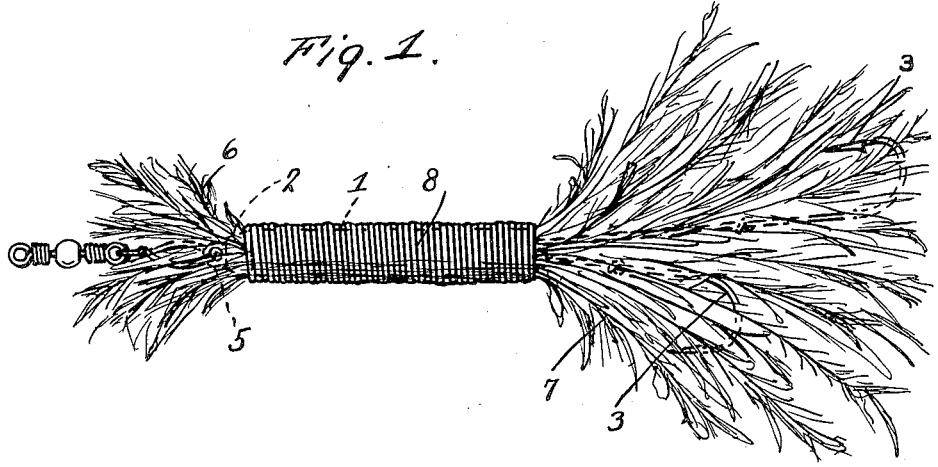
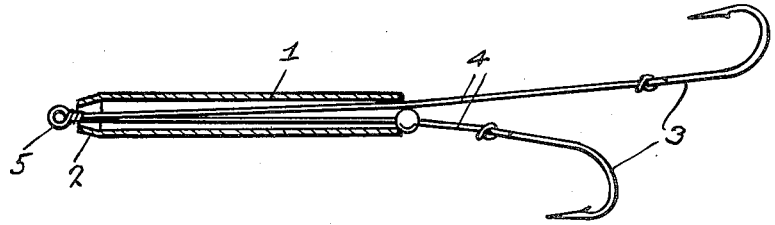
Inventor
C. W. Du Bois
By Clarence A. O'Brien
Attorney Patented June 30, 1936

2,045,703

UNITED STATES PATENT OFFICE 2,045,703

FISH LURE

Claude W. Du Bois, Seattle, Wash.

Application June 25, 1935, Serial No. 28,387

1 Claim. (Cl. 43—42)

This invention relates to a fish lure, the general object of the invention being to provide a lure which will have but little resistance when pulled through the water and will not leave a wake and which will have a life-like manner when in the water.

This invention also consists in certain other features of construction and in the combination and arrangement of several parts, to be hereinafter fully described, illustrated in the accompanying drawing, and specifically pointed out in the appended claim.

In describing the invention in detail, reference will be had to the accompanying drawing wherein like characters denote like or corresponding parts throughout the several views, and in which:—

Figure 1 is a side view of the complete lure.

Figure 2 is a sectional view through the tube showing how the hook carrying members pass through the same.

In this drawing the numeral 1 indicates a tube having its front end beveled or chamfered as shown at 2 and the numeral 3 indicates hooks which are attached to the flexible members 4 which pass through the tube and have their front ends connected to a ring 5 or the like which is of such a size as to prevent the flexible members from being pulled rearwardly through the tube. These flexible members may be formed of wire or gut or any other suitable material and if formed of wire but a single member may be used with its intermediate part twisted together to form the eye or ring 5 as shown in Figure 2.

Feathers or the like shown at 6 in Figure 1 are placed on the front part of the tube and extend substantially parallel with the tube and project beyond the front end thereof and feathers 7 are placed on the rear part of the tube and extend parallel therewith and project well beyond the rear end of the tube to cover the hooks as shown in Figure 1. These feathers are held in place in any suitable manner such as by wrapping 8 shown in Figure 1.

As it will be seen the tube 1 forms an open conduit through which water can pass when the lure is being pulled through the water so that the device will have but little resistance and the lure will not make a wake. The front feathers 6 are bent toward the rear part of the device when the same is drawn through the water but will straighten out when the forward motion is stopped, thus causing these feathers to bend backward and forward in a life-like manner. The rear feathers will trail when the lure is moved forwardly.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A fish lure of the class described comprising an elongated tube of sufficient size to have its bore form a passage for water, a flexible member passing through the tube, a hook connected with the rear end of said flexible member, an eye on the front end of the flexible member, the front end of the tube being restricted to prevent the eye from being pulled through the tube, feathers surrounding the front portion of the tube and projecting beyond the same, feathers surrounding the rear portion of the tube and projecting rearwardly beyond the same, and a wrapping surrounding the tube for holding the feathers in place.

CLAUDE W. DU BOIS.